US012168182B2

(12) United States Patent
Pierse et al.

(10) Patent No.: US 12,168,182 B2
(45) Date of Patent: Dec. 17, 2024

(54) INTERACTION BASED SKILL MEASUREMENT FOR PLAYERS OF A VIDEO GAME

(71) Applicant: Electronic Arts Inc., Redwood City, CA (US)

(72) Inventors: Christopher Pierse, Mountain View, CA (US); Xiaozhe Zhang, Mountain View, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/402,421

(22) Filed: Aug. 13, 2021

(65) Prior Publication Data

US 2023/0050195 A1 Feb. 16, 2023

(51) Int. Cl.
*A63F 13/798* (2014.01)
*A63F 13/795* (2014.01)
*A63F 13/822* (2014.01)
*G06N 7/01* (2023.01)

(52) U.S. Cl.
CPC .......... *A63F 13/798* (2014.09); *A63F 13/795* (2014.09); *A63F 13/822* (2014.09); *G06N 7/01* (2023.01); *A63F 2300/558* (2013.01)

(58) Field of Classification Search
CPC .......................... A63F 13/798; A63F 13/795
See application file for complete search history.

(56) References Cited

U.S. PATENT DOCUMENTS

| 5,813,913 | A | 9/1998 | Berner et al. |
| 5,894,556 | A | 4/1999 | Grimm et al. |
| 5,961,386 | A | 10/1999 | Sawaguchi |
| 5,964,660 | A | 10/1999 | James et al. |
| 6,012,096 | A | 1/2000 | Link et al. |
| 6,015,348 | A | 1/2000 | Lambright et al. |
| 6,023,729 | A | 2/2000 | Samuel et al. |
| 6,038,599 | A | 3/2000 | Black et al. |

(Continued)

FOREIGN PATENT DOCUMENTS

| CN | 101835516 A | 9/2010 |
| CN | 102917764 | 2/2013 |

(Continued)

OTHER PUBLICATIONS

Agarwal, S., et al., "Matchmaking for online games and other latency-senstive P2P systems." In ACM SIGCOMM Computer Communication Review, vol. 39, pp. 315-326, ACM, 2009.

(Continued)

*Primary Examiner* — Jay Trent Liddle
(74) *Attorney, Agent, or Firm* — Knobbe, Martens, Olson & Bear, LLP

(57) ABSTRACT

Skill measurement systems and methods include interaction pairs and an interaction uncertainty. The interaction pairs are pairwise matches corresponding to instances of interactions between players. The interaction uncertainty variable corresponds to the instance of interaction and is based in part on the uncertainties of a player, player team, and/or gameplay aspects. The interaction pairs and interaction uncertainty are used to more accurately determine a skill rating of a player based in part on interaction data among gameplay data from a gameplay session of a video game.

20 Claims, 6 Drawing Sheets

(56) References Cited

U.S. PATENT DOCUMENTS

| | | | |
|---|---|---|---|
| 6,128,660 A | 10/2000 | Grimm et al. | |
| 6,322,451 B1 | 11/2001 | Miura | |
| 6,352,479 B1 | 3/2002 | Sparks, II | |
| 6,641,481 B1 | 11/2003 | Mai et al. | |
| 6,699,125 B2 | 3/2004 | Kirmse et al. | |
| 6,701,344 B1 | 3/2004 | Holt et al. | |
| 6,714,966 B1 | 3/2004 | Holt et al. | |
| 6,732,147 B1 | 5/2004 | Holt et al. | |
| 6,755,743 B1 | 6/2004 | Yamashita et al. | |
| 6,829,634 B1 | 12/2004 | Holt et al. | |
| 6,910,069 B1 | 6/2005 | Holt et al. | |
| 6,920,497 B1 | 7/2005 | Bourassa et al. | |
| 7,016,942 B1 | 3/2006 | Odom | |
| 7,031,473 B2 | 4/2006 | Morais et al. | |
| 7,169,051 B1 | 1/2007 | Mossbarger | |
| 7,240,093 B1 | 7/2007 | Danieli et al. | |
| 7,264,243 B2 | 9/2007 | Yoseloff et al. | |
| 7,287,076 B2 | 10/2007 | Ewanchuck et al. | |
| 7,288,028 B2 | 10/2007 | Rodriguez et al. | |
| 7,430,719 B2 | 9/2008 | Pettinati et al. | |
| 7,470,197 B2 | 12/2008 | Massey et al. | |
| 7,549,125 B2 | 6/2009 | Dunn et al. | |
| 7,636,719 B2 | 12/2009 | Thompson et al. | |
| 7,846,024 B2 | 12/2010 | Graepel | |
| 8,360,845 B1 | 1/2013 | Hsu | |
| 8,782,121 B1 | 7/2014 | Chang | |
| 8,788,074 B1* | 7/2014 | Lewis | A63F 13/67 |
| | | | 700/92 |
| 8,882,588 B2 | 11/2014 | Buhr | |
| 9,199,173 B2 | 12/2015 | Jensen | |
| 9,630,113 B1 | 4/2017 | Jensen | |
| 9,776,091 B1 | 10/2017 | Lebrun et al. | |
| 9,833,694 B1* | 12/2017 | Subramani | A63F 13/35 |
| 9,993,735 B2 | 6/2018 | Aghdaie et al. | |
| 10,091,281 B1 | 10/2018 | Lockhart | |
| 10,207,191 B2 | 2/2019 | Jensen | |
| 10,286,327 B2 | 5/2019 | Xue et al. | |
| 10,610,786 B2 | 4/2020 | Aghdaie et al. | |
| 10,695,677 B2 | 6/2020 | Lebrun et al. | |
| 10,729,975 B1 | 8/2020 | Windrem et al. | |
| 10,751,629 B2 | 8/2020 | Xue et al. | |
| 10,967,276 B2 | 4/2021 | Jensen | |
| 11,141,663 B2 | 10/2021 | Aghdaie et al. | |
| 11,318,390 B2 | 5/2022 | Lebrun et al. | |
| 11,344,814 B2 | 5/2022 | Xue et al. | |
| 2001/0044339 A1 | 11/2001 | Cordero et al. | |
| 2002/0037767 A1 | 3/2002 | Ebin | |
| 2002/0077177 A1 | 6/2002 | Elliott | |
| 2002/0086732 A1 | 7/2002 | Kirmse et al. | |
| 2002/0091527 A1 | 7/2002 | Shiau | |
| 2002/0119821 A1 | 8/2002 | Sen et al. | |
| 2002/0195775 A1 | 12/2002 | Webb et al. | |
| 2003/0097317 A1 | 5/2003 | Burk et al. | |
| 2003/0152034 A1 | 8/2003 | Zhang et al. | |
| 2003/0212597 A1 | 11/2003 | Ollins | |
| 2003/0216183 A1 | 11/2003 | Danieli et al. | |
| 2003/0216962 A1 | 11/2003 | Heller et al. | |
| 2003/0236878 A1 | 12/2003 | Egi | |
| 2004/0097287 A1 | 5/2004 | Postrel | |
| 2004/0116186 A1 | 6/2004 | Shim et al. | |
| 2004/0143852 A1 | 7/2004 | Meyers | |
| 2004/0162144 A1 | 8/2004 | Loose | |
| 2004/0192440 A1 | 9/2004 | Evans et al. | |
| 2004/0215756 A1 | 10/2004 | VanAntwerp et al. | |
| 2004/0248652 A1 | 12/2004 | Massey et al. | |
| 2004/0255032 A1 | 12/2004 | Danieli | |
| 2005/0033601 A1 | 2/2005 | Kirby et al. | |
| 2005/0091399 A1 | 4/2005 | Candan et al. | |
| 2005/0181878 A1 | 8/2005 | Danieli et al. | |
| 2005/0192097 A1 | 9/2005 | Farnham et al. | |
| 2005/0227760 A1 | 10/2005 | Vlazny et al. | |
| 2006/0121990 A1 | 6/2006 | O'Kelley, II et al. | |
| 2006/0217167 A1 | 9/2006 | Jubinville et al. | |
| 2006/0247055 A1 | 11/2006 | O'Kelley, II et al. | |
| 2006/0258463 A1 | 11/2006 | Cugno et al. | |
| 2006/0287096 A1 | 12/2006 | O'Kelley, II et al. | |
| 2006/0287099 A1 | 12/2006 | Shaw et al. | |
| 2007/0026934 A1* | 2/2007 | Herbrich | A63F 11/0051 |
| | | | 463/23 |
| 2007/0035548 A1 | 2/2007 | Jung et al. | |
| 2007/0066403 A1 | 3/2007 | Conkwright | |
| 2007/0094279 A1 | 4/2007 | Mittal et al. | |
| 2007/0265718 A1 | 11/2007 | Graepel et al. | |
| 2008/0026846 A1 | 1/2008 | McMaster | |
| 2008/0242420 A1 | 10/2008 | Graepel | |
| 2008/0311981 A1 | 12/2008 | Schugar | |
| 2009/0098921 A1 | 4/2009 | Manning et al. | |
| 2009/0209349 A1 | 8/2009 | Padhye et al. | |
| 2009/0239650 A1 | 9/2009 | Alderucci et al. | |
| 2009/0239668 A1 | 9/2009 | Han | |
| 2010/0041482 A1 | 2/2010 | Kumar et al. | |
| 2010/0124971 A1 | 5/2010 | Baerlocher et al. | |
| 2010/0197405 A1 | 8/2010 | Douceur et al. | |
| 2010/0273557 A1 | 10/2010 | Miyaki | |
| 2010/0317420 A1 | 12/2010 | Hoffberg | |
| 2011/0252079 A1 | 10/2011 | Werner et al. | |
| 2011/0275432 A1 | 11/2011 | Lutnick et al. | |
| 2012/0283021 A1 | 11/2012 | Riego | |
| 2012/0302352 A1* | 11/2012 | Ajami | A63F 13/58 |
| | | | 463/42 |
| 2012/0323348 A1* | 12/2012 | Joo | A63F 13/34 |
| | | | 700/92 |
| 2013/0007013 A1 | 1/2013 | Geisner | |
| 2013/0023329 A1 | 1/2013 | Saunders | |
| 2013/0045803 A1 | 2/2013 | Kang et al. | |
| 2013/0132519 A1 | 5/2013 | Walsh et al. | |
| 2013/0165234 A1 | 6/2013 | Hall et al. | |
| 2013/0210527 A1 | 8/2013 | Kim et al. | |
| 2013/0262203 A1 | 10/2013 | Frederick et al. | |
| 2013/0288759 A1 | 10/2013 | Rom et al. | |
| 2013/0324240 A1* | 12/2013 | Shim | A63F 13/79 |
| | | | 463/31 |
| 2014/0011595 A1 | 1/2014 | Muller | |
| 2014/0189065 A1 | 7/2014 | van der Schaar et al. | |
| 2014/0274402 A1 | 9/2014 | Michel et al. | |
| 2014/0357367 A1 | 12/2014 | Lee | |
| 2015/0011310 A1 | 1/2015 | Lockton et al. | |
| 2015/0038234 A1 | 2/2015 | Bojorquez et al. | |
| 2015/0141141 A1* | 5/2015 | Suzuki | A63F 13/80 |
| | | | 463/31 |
| 2015/0148127 A1 | 5/2015 | Saraf et al. | |
| 2015/0375104 A1 | 12/2015 | Nishar et al. | |
| 2016/0001186 A1 | 1/2016 | Marr et al. | |
| 2016/0005270 A1 | 1/2016 | Marr et al. | |
| 2016/0255139 A1 | 9/2016 | Rathod | |
| 2016/0332081 A1 | 11/2016 | Marr et al. | |
| 2021/0291060 A1 | 9/2021 | Jensen | |
| 2023/0001309 A1* | 1/2023 | Villa | A63F 13/795 |
| 2023/0050195 A1* | 2/2023 | Pierse | G06N 7/01 |

FOREIGN PATENT DOCUMENTS

| | | |
|---|---|---|
| CN | 103945912 | 7/2014 |
| CN | 104054078 A | 9/2014 |
| CN | 104063574 A | 9/2014 |
| CN | 104254372 | 12/2014 |
| CN | 105307738 A | 2/2016 |
| CN | 105582673 | 5/2016 |
| CN | 105854301 A | 8/2016 |
| JP | 2011-161026 A | 8/2011 |

OTHER PUBLICATIONS

Agresti, A., et al., "Categorical Data Analysis." Springer, 2011.

Bell, C. E., Weighted matching with vertex weights: An application to scheduling training sessions in NASA space shuttle cockpit simulators. European Journal of Operational Research, 73(3):443-449, 1994.

Berge, C., "Hypergraphs: combinatorics of finite sets", vol. 45. Elsevier, 1984.

Bernhaupt, R., "User experience evaluation in entertainment. In Evaluating User Experience in Games", pp. 3-7. Springer, 2010.

(56) References Cited

OTHER PUBLICATIONS

Bradley, R. A., et al., "Rank analysis of incomplete block designs: I. The method of paired comparisons." Biometrika, 39(3/4):324-345, 1952.
Delalleau, E., et al., "Beyond Skill Rating: Advanced Matchmaking in Ghost Recon Online." IEEE Transactions on Computational Intelligence and AI in Games, 4(3):167-177, Sep. 2012.
Drake, D. E., et al., "A simple approximation algorithm for the weighted matching problem." Information Processing Letters, 85(4):211-213, 2003.
Duan, R., et al., "Linear-time approximation for maximum weight matching." Joural of the ACM (JACM), 61(1):1, 2014.
Edmonds, J., "Maximum matching and a polyhedrom with 0, 1-vertices." J. Res. Nat. Bur. Standards B, 69(1965):125-130, 1965.
Edmonds, J., "Paths, trees, and flowers." Canadian Journal of Mathematics, 17(3):449-467, 1965.
Elo, A. E., "The rating of chessplayers, past and present." Arco Pub., 1978.
Ferreira, J., et al., "Data mining techniguques on the evaluation of wireless churn." In ESANN, pp. 483-488, 2004.
Gabow, H. N., "Implementation of algoritms for maximum matching on nonbipratite graphs." 1974.
Gabow, H. N., "A scaling algoritm for weighted matching on general graphs." In Foundations of Computer Science, 1985., 26the Annual Symposium on, pp. 90-100, IEEE, 1985.
Glickman, M. E., "Parameter estimation in large dynamic paired comparison experiments." Applied Statistics, pp. 377-394, 1999.
Grapel, T., et al., "Ranking and Matchmaking." Game Developer Magazine, 25:34, 2006.
Hadiji, F., et al., "Predicting player chrun in the wild." In 2014 IEEE Conference on Computational Intelligence and Games, pp. 1-8, IEEE, 2014.
Herbrich, R., et al., "Trueskill: A bayesian skill rating system." pp. 569-576. Advances in Neural Information Processing Systems, 2006.
Huang, T.-K., et al., A generalized Bradley-Terry model: From group competition to individual skill. In Advances in Neural Information Processing Systems, pp. 601-608, 2004.
Jimenez-Rodriguez, J., et al., Matchmaking and case-based recommendations. 2011.
Lawler, E. L., "Combinatorial Optimization: Networks and Matroids." Courier Corporation, 2001. (Part 1 of 2).
Lawler, E. L., "Combinatorial Optimization: Networks and Matroids." Courier Corporation, 2001. (Part 2 of 2).
Lee et al; Adaptive Server Selection for Large Scale Interactive Online Games. ACM Press, 2004.
Lee, Y., et al., "Measurement and estimation of network QoS among peer Xbox 360 game players." In International Conference on Passive and Active Network Measurement, pp. 41-50. Springer, 2008.
Manweiler, S., et al., "Switchboard: a matchmaking system for multiplayer mobile games." In Proceedings of the 9th international conference on Mobile systems, applications, and services, pp. 71-84. ACM, 2011.
Menke, J. E., et al., "A Bradley-Terry artificial neural network model for individual ratings in gropu competitions." Neural computing and Applications, 17(2): 175-186, 2008.
Minotti, M., Comparing MOBAs: League of Legends vs. Dota 2 vs. Smite vs. Heroes of the Storm. Http://venturebeat.com/2015/07/15/comparing-mobas-league-of-legends-vs-dota-2-vs-smite-vs-heroes-of-the-storm/, 2016. Online; accessed May 2016.
Morik, K., et al., "Analysing customer churn in insurance date—a case study." In European Conferecne on Principles of Data Mining and Knowledge Discovery, pp. 325-336. Springer, 2004.
Myslak. M., et al., "Developing game-structure sensitive matchmaking system for massive-multiplayer online games." In Social Informatics, pp. 200-208. Springer, 2014.
Nguyen, T.-H. D., et al., "Analytics-based AI Techniques for Better Gaming Experience", vol. 2 of Game AI Pro. CRC Press, Boca Raton, Florida, 2015.
Olafsson, S., "Weighted matching in chess tournaments." Journal of the Operational Research Society, 41(1): 17-24, 1990.
Osiakwan, C. N., et al., "The maximum weight perfect matching problem for complete weighted graphs is in pc." In Parallel and Distributed Processing. 1990. Proceedings of the Second IEEE Symposium on, pp. 880-887. IEEE, 1990.
Riskin, E. A., et al., Index assignment for progressive transmission of full-search vector quantization. IEEE Transactions on Image Processing, 3(3):307-312, 1994.
Runge, J., et al., "Churn prediction for high-value players in casual social games." In 2014 IEEE Conference on Computational Intelligence and Games, pp. 1-8, IEEE, 2014.
SuperData. eSports market brief: US accounts for almost half of total viewership. https://www.superdataresearch.com/blog/esports/-brief/, 2016. Online; accessed Mar. 2016.
Tassi, P., Riot's League of Legends' Reveals Astonishing 27 Million Daily Players, 67 Million Monthly. Http://www.forbes.com/sites/insertcoin/2014/01/27/riots-league-of-legends-reveals-astonishing-27-million-daily-players-67-million-monthly/#26ff8e543511, 2016. Online; accessed May 2016.
Van Rantwijk, J., "Maximum Weighted Matching." http://jorisvr.nl/article/maximum-matching, 2013. Online; accessed May 2016.
Weber, B. G., et al., Modeling player retention in madden nfl 11. In IAAI. 2011.
Yannakakis, G., et al., Player Modeling. In Artificial and Computational Intelligence in Games, pp. 45-59. 2013.
Yoon, S., et al., Prediction of advertiser churn for google adwords. 2010.
International Search Report Application PCT/US/06/18957 dated Aug. 17, 2007.
Search Report in Chinese Application No. 2017109839330 dated Jan. 19, 2021 in 2 pages.

* cited by examiner

400

INTERACTION BASED SKILL MEASUREMENT FOR PLAYERS OF A VIDEO GAME

BACKGROUND

Accurately measuring players' skills is key to maintaining engaging experiences in gameplay sessions of video games. Inaccurately measuring skill makes for unbalanced gameplay sessions. In video games with variable and complex gameplay scenarios for players to engage in, such as battle royales, traditional solutions of player skill measurement algorithms fail to accurately or adequately measure player skill because (i) the pairwise matching approach that they use does not properly evaluate the instances of interactions engaged in by players during gameplay; and (ii) they do not account for an uncertainty that corresponds to the instances of interactions. As such, a skill measurement algorithm that includes pairwise matches corresponding to instances of interactions between players, and accounts for uncertainty corresponding to instances of interactions is advantageous to the measurement of player skill.

SUMMARY

The present disclosure is directed to a method and system for player skill measurement, the system including machine-readable instructions that, when executed by the one or more processors, cause the one or more processors to: monitor gameplay data of a gameplay session of a video game, the gameplay data comprising interaction data corresponding to instances of interactions among a plurality of player teams connected to the gameplay session; detect, based on the monitoring, at least one or more instances of interactions between two or more player teams among the plurality of player teams, the instances of interactions including respective outcomes; associate, in response to the detection of each of the one or more instances of interactions, subsets of the player teams involved in each of the respective instances of interactions, wherein each of the subsets corresponds to at least one instance of interaction detected; determine, for each player team in each subset, at least one following skill rating update based at least in part on the outcome of the corresponding instance of interaction of a respective subset: (i) player team skill rating updates, or (ii) player account skill rating updates for one or more player accounts associated with each player team.

BRIEF DESCRIPTION OF THE DRAWINGS

This disclosure will be more fully understood from the following detailed description taken in conjunction with the accompanying drawings, in which.

DETAILED DESCRIPTION

Figure 1:
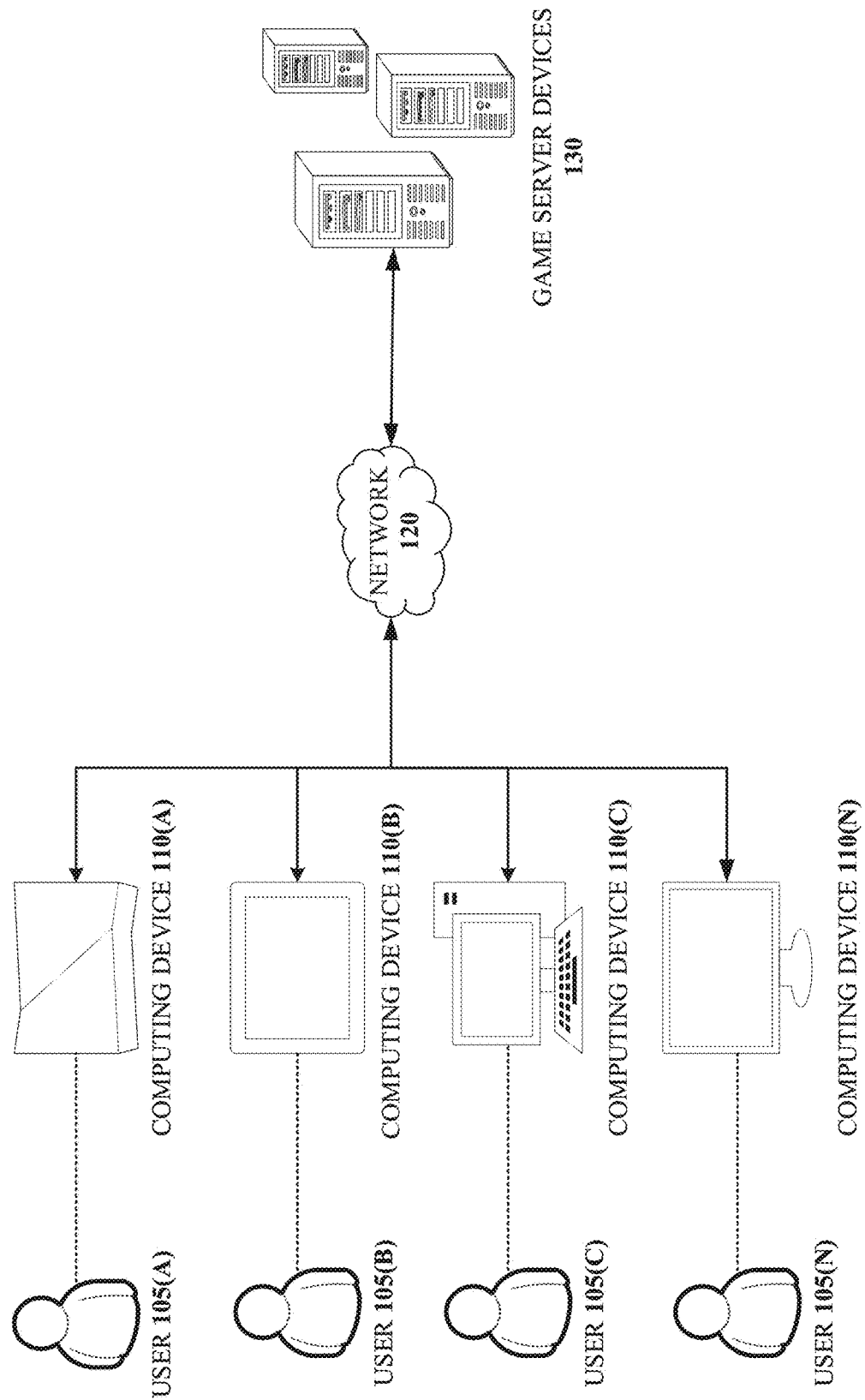
FIG. 1 illustrates an example embodiment of a system overview.

The present systems and methods describe an interaction-based skill measurement system that monitors gameplay data of a gameplay session of a video game to detect instances of interactions between players. These instances of interactions are used to create interaction pairwise matches (or simply "interaction pairs") for evaluating players' skill. These systems and methods also describe an uncertainty corresponding to the instance of interaction that is accounted for, algorithmically, in the evaluation of player skill.

As described herein, interaction data correlates to instances of interactions in gameplay among players. These instances of interactions among players can be interactions by or through player characters and/or player teams associated with a player account. Interaction data includes a variety of gameplay telemetry and statistics that define, describe, or indicate the events or circumstances, in gameplay, of player interaction in one or more instances of interactions.

As such, the gameplay performance of players can be evaluated from interaction data corresponding to one or more instances of interactions to determine a measurement of skill, or skill rating. The determination of skill may occur from a collection of interaction data corresponding to one or more instances of interactions in one or more gameplay sessions of a video game.

A skill measurement system can use interaction data to associate or create subsets of players as interaction pairs for evaluating gameplay performance of players to determine player skill. The subsets of players, or interaction pairs, are or represent an interaction-based pairwise match of player characters and/or player teams involved in an instance of interaction (e.g., the players' or player teams' interacting with one another during gameplay).

The use of interaction pairs enables the determination of skill to be relative, or corresponding to, the players involved in the instance of interaction and the players, or player teams, involved therein. For example, for a given subset of players, or interaction pair, a skill measurement system can determine a skill rating for a player team (or for the players thereof) in relation to another player team (or players thereof) within the subset. For simplicity, the terms "interaction based pairwise match", "interaction pairs", and "subsets" are used interchangeably herein.

Additionally, an uncertainty corresponding to the instance of interaction can be used by a skill measurement system in the evaluation of gameplay performance (i.e., within an instance of interaction) to determine a skill rating. The uncertainty corresponding to the instance of interaction can correspond to, or be based at least in part on, a player uncertainty, a player team uncertainty, and a gameplay uncertainty.

By virtue of the systems and methods herein, interaction pairs can provide a skill measurement that can measure player skill with more granularity, in contrast to existing systems and methods, including those that use full pairwise matches or partial pairwise matches, which compare all players and player teams of a gameplay session holistically.

In video games where no two players or player teams are guaranteed to interact, the interaction data and interaction pairs described herein enable the present skill measurement systems and methods to evaluate player skill more accurately. For example, in a battle royale game consisting of multiple player teams of one or more players, it is often the case that each player team interacts with a small number of other player teams and not the remainder of them. Furthermore, the amount of player teams interacted or engaged with during gameplay does not necessarily correspond to the placement result of a given player team.

As such, the interaction data and interaction pairs enable the present skill measurement systems and methods to evaluate player skill based on actual gameplay. This is an improvement over existing systems and methods, including those for example that use full or partial pairwise matches and thereby create inferences or presumptions of player skill that do not accurately reflect the gameplay of a gameplay session.

For example, and for non-limiting purposes of illustration, assume the following in a scenario in a team (or squad) based game, such as a battle royale. Player Team A may have seven instances of interactions with seven other player teams in a given gameplay session. Player Team A may have engaged in the most instances of interactions in the gameplay session, however, it can also be the case that Player Team A was defeated by Player Team N in the seventh instance of interaction, such that Player Team A placed fifth in the placement results. Player Team N defeating Player Team A may have been the first instance of interaction for Player Team N.

In existing skill measurement systems, including those that use full or partial pairwise matches, there would be an inference or presumption that Player Team N is more skilled than Player Team A. However, this fails to account for (i) the circumstances under which Player Team N defeated Player Team A, and (ii) the gameplay performances each player team had in the gameplay session. For example, if at the time Player Team N defeated Player Team A, Player Team N had three players actively playing at full health and Player Team A only had one player actively playing at low health (such that the other player teammates in Player Team A were eliminated or knocked down) and one active player from Player Team N eliminated the last active player of Player Team A with a single long distance attack, an inference or presumption of Player Team N being better than Player Team A does not necessarily correlate or correspond to the actual circumstances or events in gameplay.

Additionally, in existing systems, there could also be an inference or presumption that Player Team N is more skilled than all other player teams that Player Team A defeated. Similarly, in existing systems, there could also be an inference or presumption that all other player teams placing higher in the placement results than Player Team A are more skilled.

The inferences and presumptions of existing player skill systems and algorithms fail to accurately or optimally account for and measure the gameplay experience since the partial and full pairwise matching does not properly evaluate players who interacted with one another, which leads to inaccurate or less optimal skill rating measurements. Interaction pairs address this problem by providing a skill measurement system with interaction-based context around which players and player teams can be evaluated against others in the determination of their skill ratings.

This can in turn help address "third party" gameplay scenarios in the determination of player skill. As used herein, "third party" can refer to one or more player teams becoming involved in the ongoing gameplay, or instance of interaction, between two other player teams, so as to take advantage of the situation (e.g., distracted or already-engaged player teams) and defeat one or both of the two other player teams more easily.

Additionally, the determination of player skill can also be based in part on an uncertainty corresponding to the instance of interaction. The uncertainty corresponding to the instance of interaction may be based in part on player uncertainties and/or player team uncertainties of the players or player teams within the interaction pairs, and may also be based in part on an uncertainty corresponding to the gameplay session itself or uncertainty corresponding to one or more aspects of gameplay. In some implementations, each instance of interaction within a gameplay session can have a different value for the uncertainty corresponding to it.

As such, interaction data and interaction pairs, as described herein, can provide a proper basis for the evaluation of gameplay performance in a variety of gameplay circumstances and scenarios, such that each instance of interaction between player characters and/or player teams is evaluated in its own right, such that the interactions or battles between player teams are evaluated on an individual basis. Therefore, interaction data and interaction pairs enable or facilitate a skill rating to be determined based on part of actual gameplay circumstances.

Furthermore, skill measurement systems and methods can also include one or more uncertainty variables, or parameters to account for (algorithmically) one or more aspects of uncertainty corresponding to players and/or gameplay. For example, uncertainty variables can correspond to gameplay sessions, players, player teams, and instances of interactions, among of things of the like.

For example, in the battle royale genre, each gameplay session can include uncertainty in the deployment pattern, weapon and gear drops, and/or the changing closure or confrontation patterns affecting the playable area over the course of a gameplay session (such as the "Ring" in Apex Legends), among other in-game events. As such, a gameplay uncertainty ($\sigma_G$) can be defined to account for one or more aspects of uncertainty in gameplay.

In some embodiments, gameplay uncertainty ($\sigma_G$) can be configured with a value that corresponds to one or more aspects of uncertainty in gameplay. In some embodiments, each unique gameplay session type (or gameplay mode) of a video game can receive a different value to assign gameplay uncertainty ($\sigma_G$) based in part on the uncertainty of the particular gameplay session.

A player uncertainty can also be defined (for example, as $\sigma_P$) to account for one or more aspects of uncertainty corresponding to a player. In some embodiments, player uncertainty ($\sigma_P$) can correspond to (i) a player's fluctuation in skill and/or (ii) the player population's fluctuation in skill. In some embodiment, player uncertainty ($\sigma_P$) can also be based in part on player skill rating, the skill ratings of the players among the player population of a video game, the skill ratings of the players in a gameplay session, the skill ratings of player teams in a gameplay session, a competitive ranking, and other gameplay telemetry and statistics of the like.

A player's fluctuation in skill, or player skill, occurs on the player level such that it affects a particular player's gameplay experience. For example, in a gameplay session of a video game that requires players to choose player characters (e.g., legends, heroes, or other predefined playable characters of the like), if a player plays with an unpreferred player character (e.g., a character with which the player is less capable and/or has less experience), then the player may experience a fluctuation in their skill within that gameplay session. As such, the player may experience a fluctuation (e.g., decrease) in their skill based in part on one or more characteristics, abilities, or mechanics of the player character that the player is unfamiliar with, such that hinders the player from using player character effectively during gameplay.

In such cases, the system can, for that particular player, assign a value to player uncertainty ($\sigma_P$) corresponding to the observed fluctuation in player skill. As such, each player (by way of a user account or player account) can receive a unique or individualized value for player uncertainty ($\sigma_P$) based in part on an observed fluctuation, among other things, for one or more gameplay sessions of a video game.

Additionally, a player's absence from engagement with a video game for a period of time may also affect a particular player's gameplay experience. This can correspond to a player becoming unfamiliar with one or more aspects of gameplay over time. In video games with live services updates, or a video game as a service, aspects of gameplay can also change over time (e.g., the period or seasons of services) such that a returning player may be unfamiliar with one or more of the changed aspects during gameplay. As such, a returning player, who was absent from engagement for some time, may have perceivable, notable, or observable fluctuation in skill upon returning to gameplay. In such cases, the system can, for that particular player, assign a value to player uncertainty ($\sigma_P$) corresponding to; (i) the period of absence, (ii) the change in one or more aspects of gameplay over the period of absence, and/or (iii) any an observed fluctuation in skill in a gameplay session, among other factors.

Player population fluctuation in skill, or player skill, can correspond to natural fluctuations in player skill among a player base, in whole or in part, of a video game. In such cases, the value of player uncertainty ($\sigma_P$), or portion thereof corresponding to fluctuation, can be same for all players and/or the players associated with the player base observed. Additionally, the value corresponding to the natural fluctuation in players among the player base can dynamically change over time as more gameplay sessions of the video game are played and/or as the skill of the players becomes more certain over time.

In some embodiments, a value of player uncertainty ($\sigma_P$) can also correspond to other factors, such as, but not limited to, player rankings among one or more competitive seasons, the size of the player base, the types of gameplay modes or gameplay sessions.

A player team uncertainty ($\sigma_T$) can also be defined to account for one or more aspects of uncertainty of player teams. In some embodiments, player team uncertainty ($\sigma_T$) can correspond to the player uncertainty ($\sigma_P$) of the players associated with the player team. For example, player team uncertainty ($\sigma_T$) can be a summation of the player uncertainty ($\sigma_P$) of the players associated with the player team. In some embodiments, the squared value of player team uncertainty ($\sigma_T$) is equal to the summation of the squared values of the player uncertainty ($\sigma_P$) of the players associated with the player team ($\sigma_T^2 = \Sigma_i \sigma_{Pi}^2$). In some embodiments, one or more players of the player team may have a different value for player uncertainty ($\sigma_P$).

An interaction uncertainty ($\sigma_I$) can be defined to provide uncertainty for one or more instances of interactions in gameplay sessions of a video game. In some embodiments, an interaction uncertainty ($\sigma_I$) can be determined for each instance of interactions that occur between players and/or player teams in gameplay sessions of a video game.

For example, an interaction uncertainty ($\sigma_I$) of an instance of interaction can correspond to: (i) the player team uncertainties ($\sigma_T$) of the player teams involved and (ii) the gameplay uncertainty ($\sigma_G$). In some embodiments, the squared value of the interaction uncertainty ($\sigma_I$) is equal to the squared values of: (i) the player team uncertainties ($\sigma_T$) of the player teams involved and (ii) the gameplay uncertainty ($\sigma_G$), such that: $\sigma_I^2 = \Sigma_i \sigma_{Ti}^2 + \sigma_G^2$.

In video games or gameplay sessions without player teams, an interaction uncertainty ($\sigma_I$) of an instance of interaction can correspond to: (i) the player uncertainties ($\sigma_P$) of the players involved and (ii) the gameplay uncertainty ($\sigma_G$). In some embodiments, the squared value of the interaction uncertainty ($\sigma_I$) is equal to the squared values of: (i) the player uncertainties ($\sigma_P$) of the players involved and (ii) the gameplay uncertainty ($\sigma_G$), such that $\sigma_I^2 = \Sigma_i \sigma_{Pi}^2 + \sigma_G^2$.

The systems and methods described herein provide a skill measurement system that can more accurately determine skill ratings for players and player teams. These also make it possible to provide a video game or a video game service with better data (e.g., player skill ratings) to matchmake players. As a result, a more engaging gameplay experience can be provided to players as they will be matched against other players who are more closely (e.g., more accurately measured) at a similar skill level.

System Overview

FIG. 1 illustrates an example embodiment of a system overview 100. In some embodiments, system overview 100 corresponds or represents a computing environment for deploying an interaction-based player skill measurement system to evaluate gameplay data of gameplay sessions of a video game.

As shown, the system overview 100 is an environment including users 105(A), 105(B), 105(C), and 105(D) (collectively referred to herein as "105" or "users 105") of respective computing devices 110(A), 110(B), 110(C), and 110(D) (collectively referred to herein as "110 or "computing devices 110"). The computing devices are communicatively coupled to game server devices 130 over a network 120, for playing a video game.

Users 105 are players or users of video games on computing devices 110. In some embodiments, there is a one-to-one correspondence between the users 105 and the computing devices 110. In some embodiments, there is an N to one or one to N (wherein "N" is an arbitrary real value) correspondence between the users 105 and the computing devices 110. It should be understood that as described in the present disclosure, a "user" on or of a computing device playing a video game refers to or is synonymous with a "player" of the video game.

Computing devices 110 are some examples of hardware devices capable of or configured for playing or executing a video game. As illustrated in the example embodiment of FIG. 1, computing device 110(A) is a video game console; computing device 110(B) is a mobile device; computing device 110(C) is a personal computer; and computing device 110(D) is a display device. In some embodiments, computing devices 110 have dedicated hardware components that can run a video game locally. In some embodiments, two or more of the computing devices 110 are similar to one another—e.g., of a same type. In some embodiments, the computing devices 110 can run or execute video games through a cloud gaming service, as known to those of skill in the art.

In some embodiments, computing devices 110 connect to a gameplay session of a video game by way of being communicatively coupled to a game server device 130 over a network 120. Network 120 communicatively couples computing devices 110 and game server devices 130. In some embodiments, a network 105 can be any method of connectivity or communication between devices known in the arts, such as, but not limited to, a direct wired connection, Near Field Communication (NFC), Local Area Network (LAN), an internet connection, or other communication methods of the like.

Game server devices 130 provide the backend infrastructure of services for a video game. In some embodiments, game server devices 130 provide services for video games such as, but not limited to: game platform services, matchmaking, skill measurement, authentication, player account services, fraud detection, game state management, datastores, and other video game services of the like.

Game server devices 130 include one or more hardware devices with one or more processors, graphic processors, memory, and storage, in addition to networking capabilities. The one or more hardware devices of game server devices 130 can be communicatively coupled to one or more computing devices 110 over a network 120. The one or more hardware devices of game server devices 130 can be configured with one or more modules or components for providing services to computing devices 110 over a network 120. The one or more hardware devices of server devices 130 can be configured to execute software applications, such as video games, and provide streaming and/or cloud-based access and control to one or more computing devices 110.

Gameplay Environment

Figure 2:
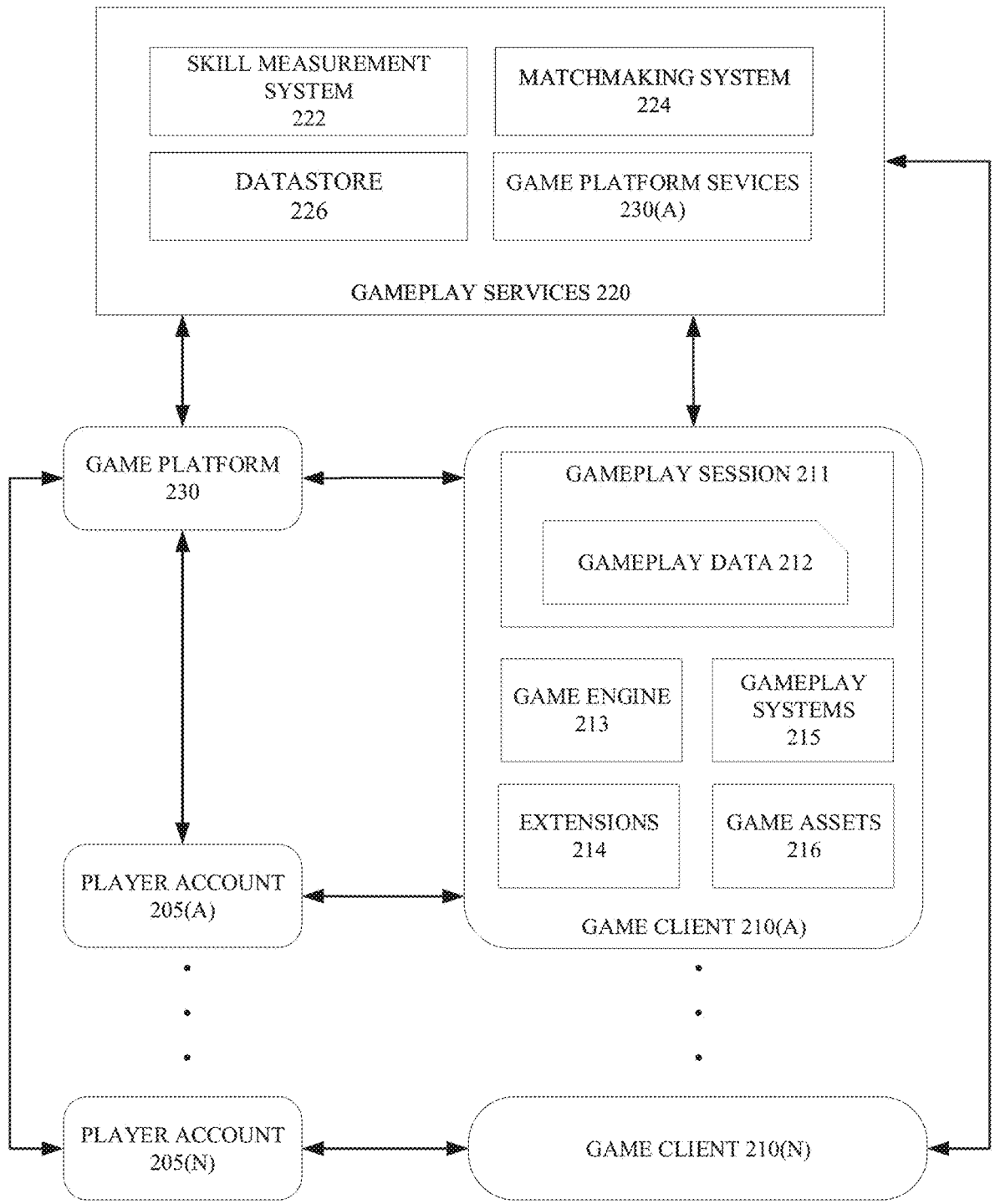
FIG. 2 illustrates an example embodiment of a gameplay environment.

FIG. 2 illustrates an example embodiment of a gameplay computing environment 200. In some embodiments, the gameplay environment 200 corresponds to a computing environment of a video game including a skill measurement system 222. The skill measurement system 222 can evaluate gameplay data 212 of a gameplay session 211 to determine skill ratings for players.

Gameplay computing environment 200 includes player accounts 205(A) to 205(N) (described in further detail below) (collectively referred to as "player account(s) 205") that can be associated with game clients 210 (collectively referred to as "game client(s) 210"), and game platform 230. Game clients 210 can be communicatively coupled to game platform 230 and gameplay services 220.

Player Account

Player accounts 205 can be accounts of, corresponding to and/or representing players or users of video games. The player accounts 205 can be associated with one or more of the game clients 210 and/or the game platform 230. In some embodiments, player accounts 205 include data, such as usernames or identifiers, for identifying or defining players in a gameplay session 211. In some embodiments, data from one or more gameplay sessions of a video game (e.g., gameplay data) can be associated with a player account 205. In some embodiments, gameplay data 212 associated with a player account 205 can be used to determine a skill rating for player account 205, which can also be communicated to and/or stored within a gaming platform 230.

A game client 210 and/or game platform 230 can require players (such as users 105 from FIG. 1) to use a player account 205 to access one or more features of game client 210, such as for accessing gameplay sessions and determining skill ratings, in some embodiments.

Game Client

Game clients 210 are software applications that define or include a video game, which can be played through a computing device, such as the computing devices 110 of FIG. 1. In some embodiments, the game clients 210 can connect players (e.g., player accounts 205) to a shared gameplay session 211 in which gameplay data 212 is produced through gameplay.

In some embodiments, game clients 210 can be of the same video game and elements 211, 212, 213, 214, 215, and 216 of game client 210(A) apply through game client 210(N). Game clients 210 may include variations among one another in some embodiments, such as, including different software instructions, components, or data for supporting different platforms or performance settings.

For example, game client 210(A) and 210(N) can be of the same video game wherein 210(A) includes variations for support on a video game console (such as computing device 110(A) in FIG. 1), while game client 210(N) includes variations for support on a mobile device (such as computing device 110(B) in FIG. 1). Game clients 210(A) and 210(N) can connect to gameplay session 211 to play together by being communicatively coupled to gameplay services 220.

Game client 210 components (e.g., game engine 213, gameplay systems 215, game assets 216, and engine extensions 214) are portions or subparts of, corresponding to and/or associated with game client 210 that provide the underlying frameworks and software that support and facilitate features of the video game.

In some embodiments, a game engine 213 is an underlying software framework that runs a video game. The game engine 213 includes, among other things, a renderer, a simulator, and a stream layer. The renderer is a graphics framework that manages the production of graphics.

The simulator is an animation framework that manages the production of animations. The stream layer is a software layer that allows a renderer and simulator to run independently of each other by providing a common execution stream for graphics and animations to be produced at runtime. In some embodiments, the game engine includes an audio engine that synchronizes audio playback with the common execution of a stream layer, among other things.

Gameplay systems 215 can be used in conjunction with a game engine 213 to facilitate and manage gameplay logic and other features of a game client 210.

In some embodiments, the game engine 213 and/or gameplay systems 215 references game assets 216 to produce a gameplay session 211. Game assets 216 are digital assets that correspond to or can be used to create the virtual interactive environments of a game client 210, such as menus and gameplay sessions. In some embodiments, the game assets 216 can include game objects, textures, terrain maps, geometry scripts, animation files, audio files, character models, video files, font libraries, visual effects, and other digital assets of video games of the like.

In some embodiments, engine extensions 214 are used in conjunction with a game engine 213. Engine extensions 214 are software components that can support the game engine 213 and gameplay systems 215. For example, engine extensions can include Software Development Kits (SDKs), Application Program Interfaces (APIs), and software libraries such as shims and/or Dynamically Linked Libraries (DLLs) that enable a variety of functionality such as providing additional graphics, audio, or communication support, establishing, and maintaining service connections, performing authorizations, and providing anti-cheat and anti-fraud detection, among other things.

Gameplay Session

The gameplay session 211 is an instance of a virtual environment of a video game, such as game client 210. In some embodiments, the gameplay session 211 is shared among game clients 210 to connect player accounts 205 to an instance of a virtual environment. In the gameplay session 211, player accounts 205 (and/or players, via their respective player accounts) can play cooperatively and/or competitively with one another, through controllable player characters and, potentially, in association with one or more player teams. For example, the gameplay session 211 can be a multiplayer team-based battle royale match of a video game in which multiple teams are each made up of multiple players.

The gameplay session 211 may include player characters. Player characters of gameplay session 211 can refer to player controllable character models used to facilitate or perform gameplay or other in-game actions. In some embodiments, a player account 205 of a game client 210 can control one or more player characters in a gameplay session 211, through a controller or similar input device. In some embodiments, a player character can be a configurable character model that is uniquely associated with a player account 205. A player character can also be a predefined or premade character model that is accessible for use in-game by one or more of the player accounts 205.

The gameplay session 211 may include player objects. Player objects of gameplay session 211 can refer to player controllable objects, or models, used to facilitate or enable gameplay or other in-game actions. It should be understood that, as used herein, "player controllable" refers to the characteristic of being able and/or configured to be controlled (e.g., moved, modified, etc.) through a controller or other input device by a player or user. Player objects may be, for example, vehicles, vessels, aircraft, ships, tiles, cards, dice, pawns, and other in-game items of the like known to those of skill in the art. In some embodiments, a player account 205 of a game client 210 can control one or more player objects in a gameplay session 211, including, in some instances, by controlling player characters which in turn causes the objects to be controlled.

Player characters and player objects controlled (and/or manipulated) by a player account 205 during gameplay session 211 can be associated with player account 205. For simplicity, player characters and player objects are collectively referred to herein as player characters in some embodiments.

The gameplay session 211 includes gameplay data 212. Gameplay data 212 is data representing the gameplay experience among player accounts 205 over the course of gameplay session 211. The gameplay actions of players, player accounts and, in turn, player characters, can produce updates or changes to the gameplay data 212.

In some embodiments, gameplay actions of a player character and/or player team interacting or engaging with another player character and/or player team are referred to as "instances of interactions." These instances of interactions are captured as or in "interaction data" within the gameplay data 212. It should be understood that an instance of interaction can be of any time length desired or deemed optimal, for example, for skill measurement. Interaction data can be included in gameplay data 212 when an instance of interaction occurs—those instances of interactions including, but not being limited to: completing an objective or portion thereof; moving from one position of a level to another; eliminating, damaging, buffing, debuffing, identifying, or aiding another player character; or communicating with another player character.

Captures or inclusions of interaction data within gameplay data 212 can include data corresponding to the instance of interaction. Those captures or inclusions of interaction data can be or include, for example, the players involved in the instance of interaction, the gameplay actions of all players involved during (and/or at one or more times adjacent to the interaction), the location and movement of the players, and the outcome of the instance of interaction, among others. The outcome of an instance of interaction can be the elimination of a player character and/or player team by another player character and/or player team.

In some embodiments, gameplay data 212 also includes information about, but not limited to: (i) connected player accounts 205 and game clients 210, (ii) player characters and/or player teams associated with player accounts 205, (iii) status, position, and gameplay actions of player characters and/or player teams, (iv) the status and position of virtual objects, (v) the status of one or more gameplay objectives, (vi) the gameplay services 220, and/or other gameplay telemetry and statistics of the gameplay session known to those of skill in the art.

In some embodiments, gameplay data 212 is periodically or continuously updated and/or produced over the course of the gameplay session 211. In some embodiments, game clients 210 and/or gameplay services 220 are configured to store gameplay data 212 of a gameplay session 211 periodically, continuously, or at the occurrence of some event or trigger.

In some embodiments, gameplay data 212 is stored at the end of a respective gameplay session. In some embodiments, gameplay data 212 is versioned, such that a number of versions or states of gameplay data 212 are stored over the course of gameplay. The storing of gameplay data 212 allows gameplay services 220 to evaluate and measure player skill in gameplay session 211, such as by skill update system 222 that can provide skill rating for a video game as a service.

Gameplay Services

Gameplay services 220 are backend services of a video game. In some embodiments, gameplay services 220 are provided by game server devices 130 of FIG. 1. In some embodiments, an interaction-based player skill measurement system can be a service among the gameplay services 220 for game client 210. In some embodiments gameplay services 220 includes a skill measurement system 222, matchmaking system 224, datastore 226, and game platform services 230(A), among other components or modules.

Skill measurement system 222 is an interaction-based player skill measurement system that provides skill rating updates based at least in part on one or more of interaction data, win probabilities, skill ratings, and placement results corresponding to player accounts, player characters and/or player teams, among others.

Win probabilities correspond to a likelihood of success for a player team, player character, and/or player account 205 in a given gameplay session, such as gameplay session 211. For example, in a team based multiplayer video game, each player team in a gameplay session can be assigned a win probability for that respective gameplay session. A win probability can be determined by a matchmaking service, such as matchmaking system 224, or other gameplay service at the initialization or start of a multiplayer gameplay session. In some embodiments, player accounts 205, player characters, and/or player teams connecting to or engaged in a gameplay session 211 are evaluated against one another in the determination of win probabilities that correspond to gameplay session 211. The evaluation of a win probability can be based in part on the skill rating(s) associated with player accounts 205 and/or player teams, among other things.

A skill rating is a persistent, semi-persistent, or temporary value (such as a data type) associated with a player character, player team, and/or player account 205. In some embodiments, a skill rating is an indication of skill of the respective player character, player team and/or player account in a video game. Skill ratings can be defined by numerical values, or character-based data types, and the like as known to those of skill in the art. Skill ratings can be presented in game in a number of ways, including, but not limited to, a score, a rank, a category, or other in-game indication of the like.

The skill rating updates provided and/or determined by skill measurement system 222 determine, alter, modify, increment, decrement, scale, substitute or replace a skill rating of a player account, player character, and/or player team of the video game.

For example, skill measurement system 222 can determine a skill rating update corresponding to a player team in gameplay session 211 based in part on gameplay data 212. Thereafter, the skill rating update for the player team can be used to determine a skill rating update for one or more of the player accounts 205 associated with the player team. The determination of a skill rating update for a player account 205 can be proportionally based in part on the contribution of gameplay actions by the player account 205 or associated player character; as indicated for example by interaction data within gameplay data 212.

In some embodiments, skill measurement system 222 determines a skill rating update for a player account 205 and/or player character independent and/or irrespective of a skill rating update determined for a player team. In some embodiments, skill measurement system 222 can apply skill rating updates to player accounts 205. In some embodiments, the skill measurement system 222 can provide gameplay services 220 and/or game platform services 230(A) with one or more skill rating updates to apply to one or more player accounts 205.

Skill measurement system 222 can be configured or based in part on a player skill determination algorithm, such as, for example, a Bayesian based algorithm. In some embodiments, the skill measurement system 222 can utilize interaction data to create or associate subsets (e.g., pairwise matches) of player teams, player characters and/or player accounts. The subsets created are interaction based pairwise matches ("interaction pairs") that indicate which player accounts 205, player characters, and/or player teams interacted with another in an instance of interaction.

The following example is presented solely for purposes of illustration. The subsets or interaction pairs represent two or more player teams (and/or player characters and/or player accounts) involved in each instance of interaction, as provided by interaction data from gameplay data 212. In some embodiments, skill measurement system 222 creates or associates these subsets in response to the detection of interaction data, such that each instance of interaction has a corresponding subset. In some embodiments, interaction data is configured to be produced with or include interaction pairs or subsets already indicated or determined.

For example, an instance of interaction in which player character A (associated with player account 205(A) and player team A) attacked and eliminated player character B (associated with player account 205(B) and player team B) can represented in a subset as:
INTERACTION PAIR 0 {PLAYER TEAM A, PLAYER TEAM B;
PLAYER CHARACTER A, PLAYER CHARACTER B;
PLAYER ACCOUNT 205(A), PLAYER ACCOUNT 205(B);}

In some embodiments, one or more subsets can be associated for each instance of interaction. For example, when three player teams are involved in a single instance of interaction, the skill measurement system 222 can associate three interaction subsets to capture the interactions that occur between pairs of teams, such as:
INTERACTION PAIR 1 {PLAYER TEAM A, PLAYER TEAM B;}
INTERACTION PAIR 2 {PLAYER TEAM A, PLAYER TEAM C;}
INTERACTION PAIR 3 {PLAYER TEAM C, PLAYER TEAM B;}

In some embodiments, subsets may include two or more player teams. Alternatively, in some embodiments, game client 210 can be configured to produce interaction data between two teams at most. Subsets may also include other data such as the rank, skill, or player character(s) of the player accounts and/or player teams in the subset.

In some embodiments, subsets temporarily exist and/or are stored in the memory of a respective computing device (such as a server device) during the processing of gameplay data 212. In some embodiments, interaction subsets may also or alternatively be stored in datastore 226 of gameplay services 220.

In some embodiments, skill measurement system 222 (or the algorithm(s) thereof) includes one or more uncertainty variables (such as the aforementioned $\sigma_P$, $\sigma T$, $\sigma_G$, and $\sigma_I$) in addition to other variables that are traditionally used to categorize ranking or skill measurement in existing Bayesian based player skill measurement algorithms.

In some embodiments, each instance of interaction in a gameplay session has interaction uncertainty ($\sigma_I$). The value of an interaction uncertainty can be based in part on the player uncertainties ($\sigma_P$) and/or player team uncertainties ($\sigma_T$) of the respective players or player teams in an instance of interaction. The value of an interaction uncertainty can also be based in part on a gameplay uncertainty ($\sigma_G$).

In some embodiments, skill measurement system 222 includes a gameplay uncertainty ($\sigma_G$) that represents an uncertainty in gameplay, such as, for example, the randomness associated with each gameplay session of a battle royale video game. As mentioned above, in some embodiments, uncertainty can be caused by the design of the game. In some embodiments, The gameplay uncertainty ($\sigma_G$) would have a value that is applicable to the gameplay sessions of game client 210.

In some embodiments, one or more gameplay sessions of game client 210 can be associated with a different value for the gameplay uncertainty ($\sigma_G$). For example, a different value may be assigned or provided a gameplay uncertainty ($\sigma_G$) when the gameplay session of a video game corresponds to a new gameplay mode. The new gameplay mode can include one or more unique gameplay mechanics or aspects, and/or one or more modifications, alterations, or changes, to existing game mode type. The different value assigned or provided to a gameplay uncertainty ($\sigma_G$) can be used to accommodate how players experience new or changed content or aspects of gameplay in the new game mode, as it may impact play skill during the gameplay session. Additionally, the value of gameplay uncertainty ($\sigma_G$) can change over the course of a gameplay session, based in part on one or more in-game events.

In some embodiments, skill measurement system 222 includes a player uncertainty ($\sigma_P$). A player uncertainty ($\sigma_P$) can account for how player skill can fluctuate. Player skill may fluctuate in a number of ways, including, but not limited to, an absence from gameplay engagement or a change in one or more aspects of gameplay.

In some embodiments, the value of a player uncertainty ($\sigma_P$) is the same for all players. In some embodiments, the value of a player uncertainty ($\sigma_P$) can vary among players. As such, the value of player uncertainty may be a value that reflects or estimates uncertainty associated with a player and/or uncertainty associated among the player base in whole, or in part.

In some embodiments, each player team in a gameplay session has a player team uncertainty ($\sigma_T$), wherein the value corresponds to the player uncertainties ($\sigma_P$) of the players. As such, each player team in a gameplay session may have a different value for their respective player team uncertainty ($\sigma_T$), based in part on the unique or individual values of the player uncertainties ($\sigma_P$) of the players. The value of the player team uncertainty ($\sigma_T$) may be determined by an average, median, sum, summation, or other algorithmic calculation of the player uncertainties ($\sigma_P$) of the respective players of a player team. Alternatively, the value of the player team uncertainty ($\sigma_T$) may be arbitrary. To simplify, but not limit, the disclosure, the squared value of player team uncertainty ($\sigma_T$) is equal to the summation of the squared values of the player uncertainty ($\sigma_P$) of the players associated with the player team ($\sigma_T^2 = \Sigma_i \, \sigma_{Pi}^2$).

In some embodiments, uncertainty variables ($\sigma_P$, $\sigma_T$, $\sigma_G$, and $\sigma_I$) can correspond to, and be determined with, other gameplay related factors or aspects, such as player population, player rankings, and gameplay modes of a video game. To simplify, but not limit, the disclosure, the squared value of the interaction uncertainty ($\sigma_I$) is equal to the squared values of: (i) the player uncertainties ($\sigma_P$) of the players involved and (ii) the gameplay uncertainty ($\sigma_G$), such that $\sigma_I^2 = \Sigma_i \, \sigma_{Pi}^2 + \sigma_G^2$.

In some embodiments, each instance of interaction in a gameplay session has a unique value for the interaction uncertainty ($\sigma_I$). In some embodiments, one or more instances of interactions in a gameplay session have the same value for the interaction uncertainty ($\sigma_I$). In some implementations, similar instances of interactions in separate gameplay sessions of a game can have the same value, or a different value, for the interaction uncertainty ($\sigma_I$).

In some embodiments, game client 210 can be configured to provide gameplay services 220 and/or skill measurement system 222 with the values for uncertainty variables ($\sigma_P$, $\sigma_T$, $\sigma_G$, and $\sigma_I$). In some embodiments, skill measurement system 222 can be configured, with a deterministic logic or machine learning system, to determine the values of the uncertainty variables ($\sigma_P$, $\sigma_T$, $\sigma_G$, and $\sigma_I$). In some embodiments, skill measurement system 222 is configured with values to provide uncertainty variables ($\sigma_P$, $\sigma_T$, $\sigma_G$, and $\sigma_I$).

By virtue of the uncertainty variables ($\sigma_P$, $\sigma_T$, $\sigma_G$, and $\sigma_I$) and interactions pairs described herein in enhance or improve skill measurement systems by providing players with more accurate skill measurements for complex or varying gameplay scenarios that may occur within a gameplay session (e.g., battle royale games). That is, in these games, players, through their player characters and/or player teams, are free and/or able to engage in combat in any manner with the randomly distributed loot they are able to acquire and have their player skill more accurately evaluated based in part on the instances of interactions that occur as a result.

A matchmaking system 224 is a backend service that matches and connects players to a gameplay session of a video game. Matchmaking system 224 can determine matches based in part on a variety of criteria including, but not limited to, skill ratings of a player account 205 and player teams, a gameplay session type, networking conditions, and other factors of the like known to those of skill in the art.

Game platform services 230(A) are services to or for the game platform 230. In some embodiments, the game platform 230 is a software client that utilizes game platform services 230(A) to perform networking functionality, such as creating and validating player accounts 205, establishing authentication for player accounts 205, providing social services on a platform or in-game level for player accounts 205 and/or game clients 210, and other platform functionalities of the like.

Game clients 210 and game platform 230 can communicate with gameplay services 220 over a network; such as network 120 illustrated in FIG. 1. In some embodiments, gameplay services 220 establish and maintain connections among game clients 210 and player accounts 205 to facilitate a multiplayer gameplay for gameplay session 211. Gameplay data 212 of the gameplay session 211 can be stored within a datastore 226.

Gameplay Data

Figure 3:
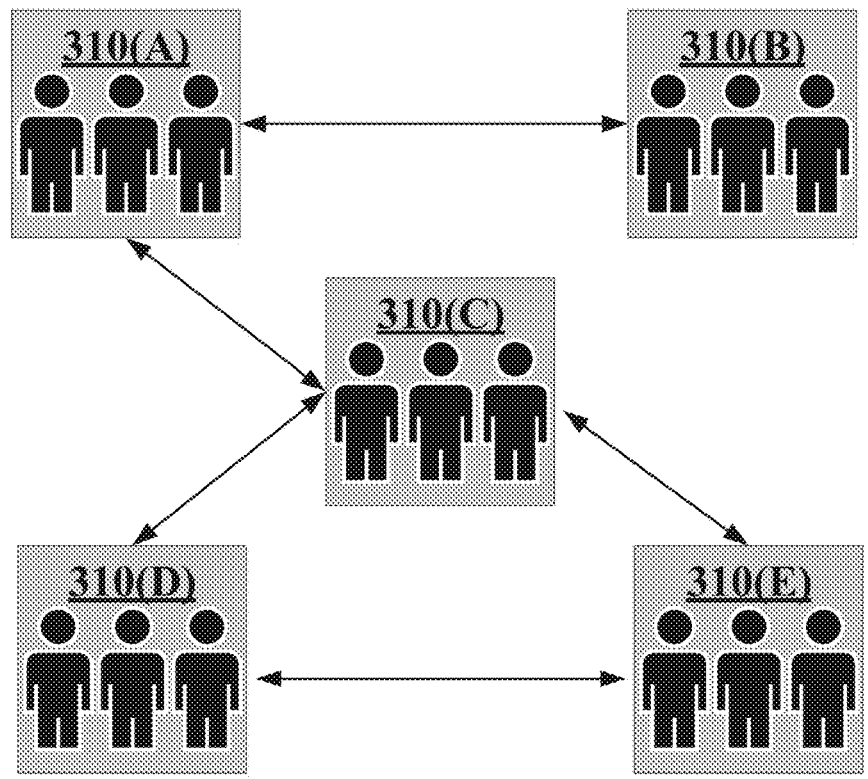
FIG. 3 illustrates an example embodiment of gameplay data.

FIG. 3 illustrates an example embodiment of gameplay data 300 from a gameplay session 211 of a video game. In some embodiments, the illustration of gameplay data 300 represents gameplay data 212 at the completion of gameplay session 211. In some embodiments, gameplay data 300 is accessible to the skill measurement system 222 for determining skill rating updates, such as for player accounts 205 and/or player teams.

Gameplay data 300 includes data of player teams involved in a respective gameplay session. The data of player teams is illustrated as player teams 310(A), 310(B), 310(C), 310(D), and 310(E) (collectively referred to herein as "310" or "player team(s) 310") that each include three player characters. In some embodiments, more or fewer player teams 310 and/or player characters may be included in the gameplay data 300.

Gameplay data 300 can also include data or information corresponding to each player team 310, such as, but not limited to: player accounts 205 associated with player characters, gameplay scores and statistics, gameplay telemetry, player character statistics, skill ratings, win probabilities, and other game related data of the like.

Gameplay data 300 can also include skill rating data 320 which contains the skill ratings associated with each player team 310 in a gameplay session. In some embodiments, the skill ratings of player teams 310 are based at least in part on the skill rating(s) of the one or more player accounts associated with the respective player team 310. For example, the skill rating of a player team 310 may be the sum, average, or median of the skill ratings of each player account 205 associated with the player team 310.

In some embodiments, the skill ratings are based in part on historical gameplay from the respective player accounts associated with each player team 310. For example, the skill rating of a player account may be derived or aggregated from the overall gameplay experience associated with the player account, such as, for example, from all of the gameplay sessions the player account has ever participated in. In some embodiments, a skill rating may be based in part on one or more specific gameplay modes of a video, such that only the player accounts participation in gameplay sessions of those gameplay modes are used to determine the skill rating. In some embodiments, a player account may have one or more skill ratings associated with it. In some embodiments, the skill rating associated with a player account can be reset and/or done in a periodic or other incremental manner.

Gameplay data 300 can also include win probability data 330 containing the win probability values for player teams 310 in a gameplay session. In some embodiments, the win probabilities are based in part on the skill ratings of the player teams 310. In some embodiments, the win probabilities are based in part on win probabilities of each player account 205 associated with the player team 310.

Gameplay data 300 can also include placement result data 340 that indicates the final placements of each player account and/or player team 310 in a gameplay session. Gameplay data 300 can also include other data from gameplay session 211, such as the player accounts and/or player teams with the most or least damage, eliminations, assists, revives, respawns, points, and other gameplay statistics of the like.

In some embodiments, the gameplay data 300 includes interactions pairs 350 that corresponds to subsets of player teams, such as the interaction based pairwise matches described in FIG. 2. In some embodiments, skill measurement system 222 can monitor gameplay data 300 to detect interaction data to determine interaction pairs 350. To illustrate, the arrows between player teams 310 provide a visualization of the interaction pairs detected among the interaction data provided in gameplay data 300. In some embodiments, interaction pairs 350 can simply be provided as part of gameplay data 300, such that interaction data is provided with interaction pairs 350.

In some embodiments, the gameplay data 300 includes player team uncertainty 360 that corresponds to the uncertainties of player teams 310. The values of the uncertainties of player teams 310 may be based in part on the uncertainties of the respective players of the player team. In some implementations, the player team uncertainties 360 may be determined in or for each gameplay session of a video game. For example, in a team based multiplayer gameplay session of a video game, players may be assigned to a player team upon entering a multiplayer gameplay session, such that the player teams are uniquely chosen or assigned in each gameplay session.

In some embodiments, the value of a player team's uncertainty may change over the course of gameplay, when, for example, one or more players of the player teams leaves the gameplay session early and reduces the total number of players in a player team. In gameplay sessions with a designated number of players for player teams, a player team with more or less than the designated number of players may be assigned a value that differs more than the average player team in the gameplay session, so as to further account for the odds of success.

In some embodiments, gameplay data 300 can be used by a skill measurement system 222 to determine a skill rating for each player team for each instance of interaction that occurred during gameplay session 211. In some embodiments, gameplay data 300 can be used by a skill measurement system 222 to determine an interaction uncertainty for each instance of interaction that occurred during the gameplay session 211. In some embodiments, a gameplay uncertainty can also be used by skill measurement system 222 to determine an interaction uncertainty for each instance of interaction that occurred during the gameplay session 211. In some embodiments, a gameplay uncertainty of an instance of interaction factors into, algorithmically, the determination of a skill rating for player or player team from an instance of interaction. For example, the interaction uncertainty can alter, modify, scale, reduce, and/or otherwise algorithmically affect the value of a skill rating determined for each instance of interaction.

In some embodiments, gameplay data 300 includes the data (e.g., text data) from 310, 320, 330, 340, 350 and/or 360 without the characters, arrows, or tables as illustrated. It should be understood that the illustrations do limit the disclosure to particular data types, organizations, structures, or formats for gameplay data. In some embodiments, gameplay data 300 consists of text data that describes a variety of gameplay telemetry, statistics, and other aspects of a gameplay session.

Instance of Interaction

Figure 4:
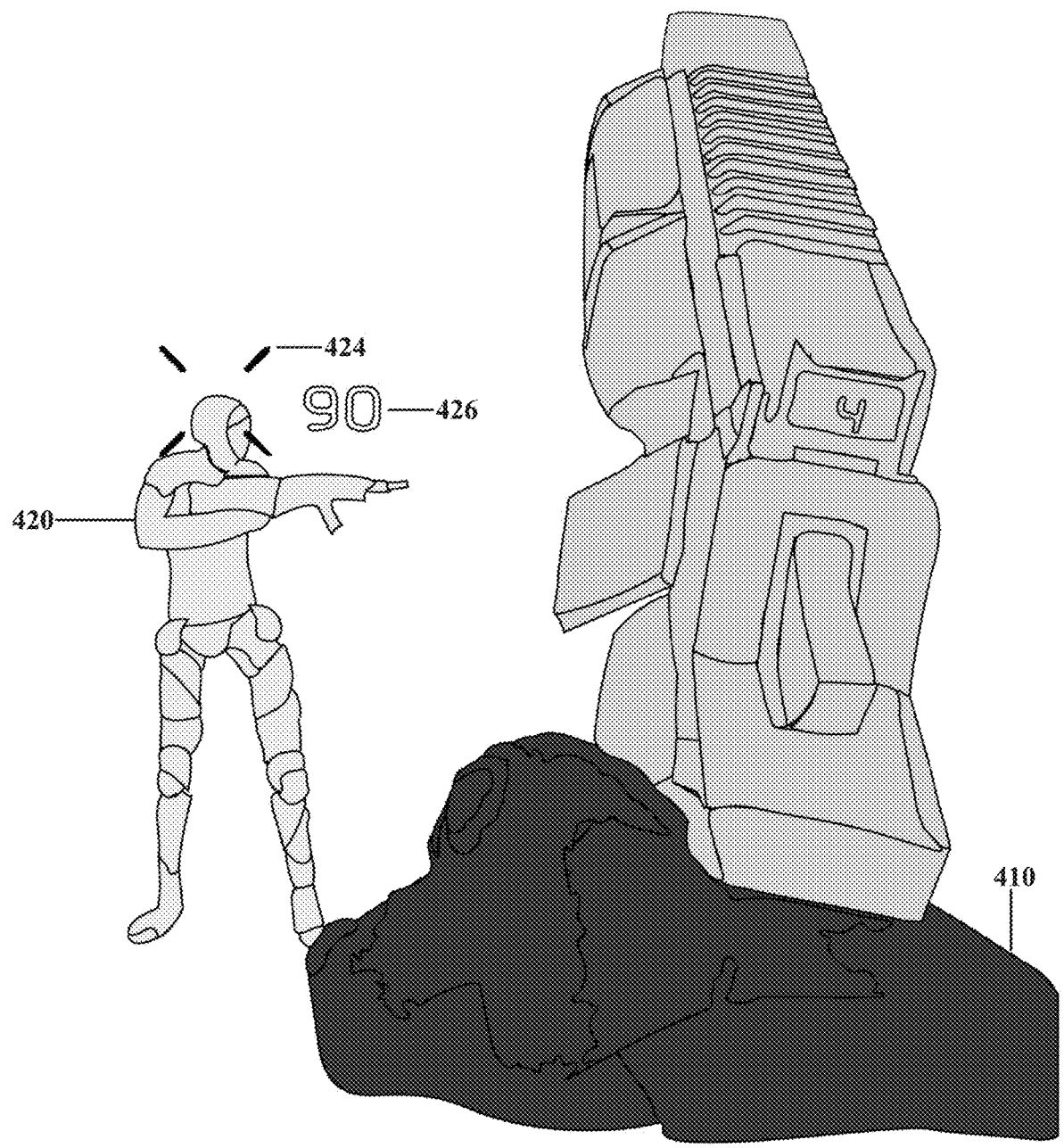
FIG. 4 illustrates an example embodiment of an instance of interaction between player teams in a gameplay session of a video game.

FIG. 4 is an illustration 400 of an example embodiment of an instance of interaction between player teams in a gameplay session of a video game. In some embodiments, 400 illustrates an instance of interaction in gameplay session 211 on game client 210, such that the instance of interaction is included in gameplay data 212 as interaction data.

Illustration 400 is in the first perspective of player character 410, such that hands wielding a weapon illustrate player character 410. In some embodiments, player character 410 and player character 420 are of different player teams in a gameplay session of a video game. Player character 410 and player character 420 are each associated to a player account, in some embodiments.

The instance of interaction between player character 410 and player character 420 illustrated in 400 is an instance of damage inflicted to player character 420 from player character 410. Damage indicator 424 is an indication of damage infliction on player character 420 by player character 410. Damage amount 426 is a damage value associated with the damage infliction on player character 420. In some embodiments, data of the damage inflicted and the damage value associated with damage indicator 424 and damage amount 426 becomes part of the gameplay data of the respective gameplay session. In some embodiments, gameplay data of a gameplay session can, at or after the occurrence of the instance of interaction illustrated in 400, include data indicating that player character 410 inflicted "90" damage on player character 420.

In some embodiments, gameplay data of a gameplay session can include data that provides context for each instance of interaction included in the gameplay data, such as each player character involved each instance of interaction, the player teams associated with each player character, the player accounts the player characters and/or player teams are associated with, the location where the instance of interaction occurred, the distance between the player characters, the weapons, items, attack or other gameplay action or element of the like associated with each instance of interaction, the locations on the player characters where damage is inflicted, the occurrence of a player character being knocked down or eliminated as a result of an instance of interaction, the occurrence of a player team and/or player character advancing a gameplay objective as a result of an instance of interaction, among other gameplay telemetry.

Illustration 400 provides one example of an instance of interaction in a gameplay session of a video game. Instances of interactions in a gameplay session of a video game may also include gameplay actions in which one player character and/or player team applies a buff, debuff, revives, identifies, tags, indicates, stuns, flashes, disables, burns, bamboozles, misguides, flanks, blinds, suppresses, stops, blocks, damages, or heals another player character and/or player team.

Illustration 400 also provides one example of an instance of interaction in a gameplay session of a video game that would have an interaction uncertainty corresponding to, or associated with it. The interaction uncertainty may be based in part on the uncertainties associated with, or corresponding to, player character 410 and player character 420; such as a player team uncertainty or a player uncertainty.

Skill Measurement

Figure 5:
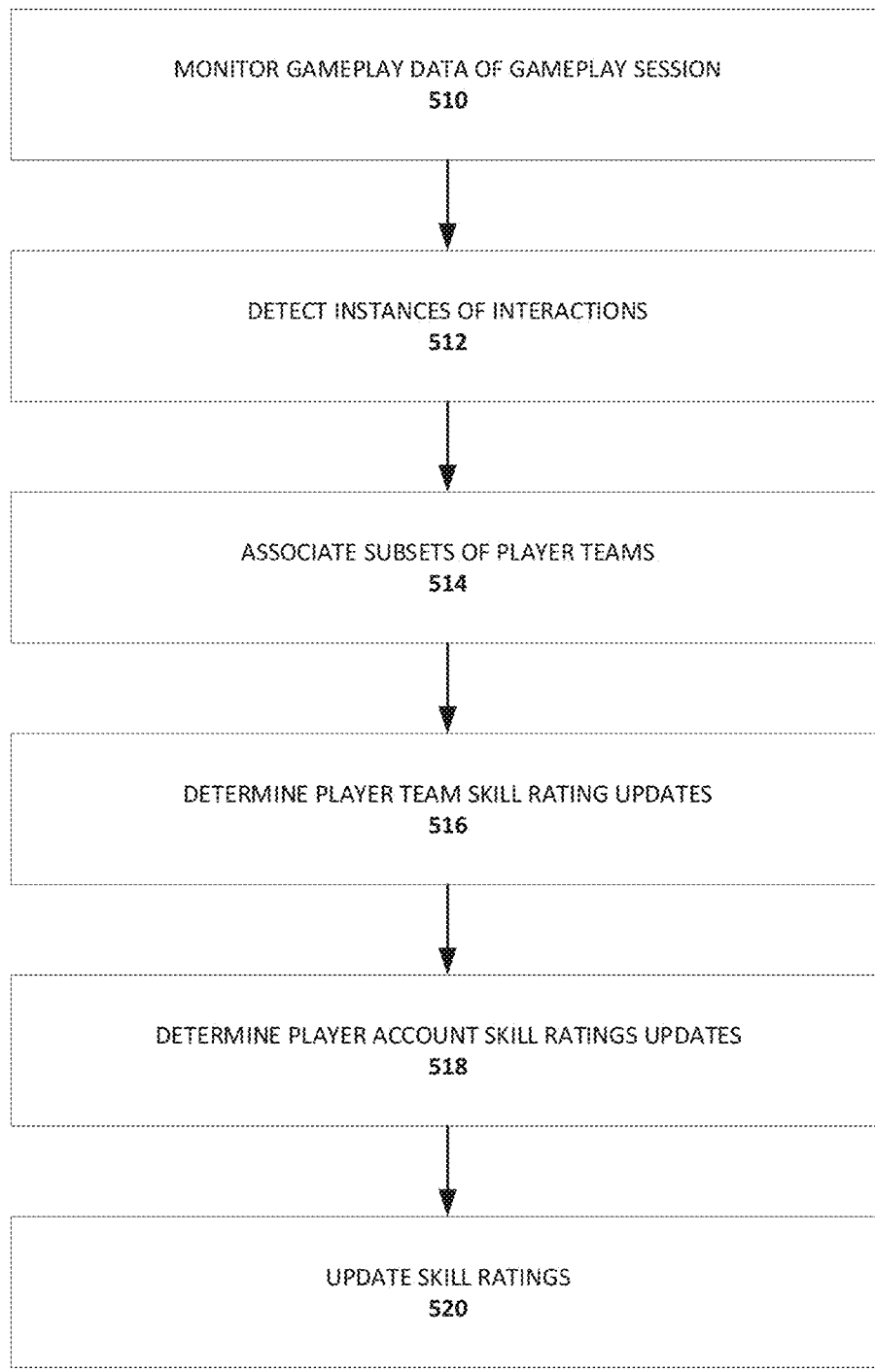
FIG. 5 illustrates an example embodiment of a process of measuring player skill.

FIG. 5 illustrates an example embodiment of a process 500 for measuring or evaluating player skill by determining a skill rating update. The measurement or evaluation of player skill by process 500 can be based in part on gameplay data including the skill ratings, win probabilities, placement results, and interaction data of player teams (and associated player accounts). The measurement or evaluation of player skill by process 500 can also be based in part on subsets (e.g., interaction pairs) and an uncertainty variable, such as those described above with reference to at least FIG. 2, FIG. 3, and FIG. 4.

In some embodiments, process 500 can correspond to determination of skill rating updates made by skill measurement system 222. At step 510, skill measurement system 222 monitors gameplay data 212 of a gameplay session 211. At step 512, skill measurement system 222 detects interaction data corresponding to instances of interactions between two or more player characters and/or player teams.

The skill measurement system 222 can monitor gameplay data 212 to detect interaction data, among other data, by any common implementations known to a person of ordinary skill in the art, including, but not limited to: scripts configured to deterministically or logically identify, detect, and/or retrieve data from one or more data fields of data base or other data source; machine learning networks configured to identify, detect, and/or retrieve data from one or more data fields of data base or other data source; and/or other common data analysis, scanning, or auditing of methods of the like.

At step 514, the skill measurement system 222 associates or creates subsets (e.g., interaction pairs) of player characters and/or player teams involved in an instance of interaction, based at least in part on the interaction data detected. In some embodiments, the player accounts associated with the player characters and/or player teams may also be included in the subset or be associated into a separate subset.

In some embodiments, the association or creation of subsets is performed in response to the detection of interaction data between two or more teams. For example, when detecting an instance of interaction where one player character of a player team attacks another player character of another player team—such as in illustration 400 of FIG. 4—the skill measurement system may associate both player characters and/or all player characters within both respective player teams within a subset.

In some embodiments, gameplay data 212 can be configured to include subsets as part of interaction data. As such, the detection of interaction data would directly provide the skill measurement system 222 with subsets, allowing the step of associating subsets to be omitted from process 500.

The subsets serve as pairwise matches for skill measurement system 222 to evaluate gameplay data 212. In some embodiments, the subsets provide context to each instance of interaction evaluated by skill measurement system 222. The subsets inform skill measurement system 222 which player teams and/or player accounts where involved in a specific instance of interaction. This in turn, ensures that the player teams and/or player accounts within the subset are evaluated against one another in the evaluation of instances of interaction.

As such, a subset or interaction pair enables each instance of interaction to be evaluated independently, such player skill is evaluated contextually with respect to gameplay that actually occurred during the gameplay session.

In some embodiments, skill measurement system 222 can also associate, or create an interaction uncertainty to each instance of interaction that is based at least in part on a gameplay uncertainty and the player uncertainties and/or player team uncertainties corresponding to the subset. In some implementations, the associations or creations of interaction uncertainties can occur in another step of process 500.

At step 516, skill measurement system 222 determines player team skill rating updates. In some embodiments, player team skill rating updates are determined for each player team in each subset. The determination of player team skill rating is based at least in part on (i) the outcomes of instances of interactions corresponding to each subset and (ii) interaction uncertainties, in some embodiments.

For example, if Player Team A defeats Player Team B in an instance of interaction, the outcome is the defeat of Player Team B by Player Team A, or inversely, the victory of Player Team A over Player Team B. Skill measurement system 222 can be configured to provide some value or weight for a victory, defeat, or draw as outcome in the determination of a player team skill rating update.

Where a player team engaged in multiple instances of interactions in a single gameplay session, the skill measurement system 222 can produce a player team skill rating update that is the aggregate of each evaluated outcome.

In some embodiments, the skill measurement system 222 can also utilize the other data among gameplay data 212 to determine player team skill rating updates, including, but not limited to (i) the skill ratings of player accounts associated with the player teams in each subset, (ii) the skill ratings of player teams in each subset, (iii) win probabilities of player teams in each subset, (iv) placement results of player teams in each subset, and/or (v) gameplay actions of player characters associated with the player teams in each subset.

In some embodiments, the skill measurement system 222 can be configured to provide a unique value or weight to each of the aforementioned data types in the determination of a player team skill rating update.

At step 518, the skill measurement system 222 determines player account skill rating updates. In some embodiments, the determination of player account skill ratings is based at least in part on (i) the outcomes of instances of interactions corresponding to each subset that the player account is associated with, and (ii) interaction uncertainties. Skill measurement system 222 can be configured to provide a value or weight for a victory, defeat, or draw outcome for each instance of interaction the player account engaged in.

Where a player account engaged in multiple instances of interactions in a single gameplay session, the skill measurement system 222 can produce a player account skill rating update that is the aggregate of each evaluated outcome. In some embodiments, instances of interactions a player engaged in across multiple gameplay sessions may be aggregated to determine skill rating update. In some implementations, a skill measurement system 222 can be configured to make the determination on gameplay session basis or on a periodic basis, such as over the course of a period of time and/or after an amount of gameplay sessions.

In some embodiments, skill measurement systems 222 can also utilize the other data among gameplay data 212 to determine player team account rating updates, including, but not limited to (i) the skill ratings of player accounts associated in each subset, (ii) the skill ratings of player teams corresponding to player accounts in subset, (iii) the win probabilities of player accounts in each subset, (iv) the placement results of player accounts or corresponding player teams in each subset, (v) the gameplay actions of player characters associated with the player accounts in each subset, and/or (vi) the uncertainty variables (e.g., $\sigma_P$, $\sigma_T$, $\sigma_G$, and $\sigma_I$).

In some embodiments, the skill measurement system 222 can be configured to provide a unique value or weight to each of the aforementioned data types in the determination of a player account skill rating update.

In some embodiments, the determination of player team skill rating updates 516 and player account skill ratings updates 518 can be accomplished through a Bayesian based algorithm where the subsets serve as pairwise matches. In some embodiments, the determination of player team skill rating updates 516 and player account skill ratings updates 518 can be accomplished through a Bayesian based algorithm where an uncertainty variable, such as described in FIG. 2, provides a range of permitted deviation from an algorithmic curve that is utilized to determine skill in a video game.

In some embodiments, the determination of a player account skill rating update 518 can be based in part on a respective player team skill rating update at block 516. For example, a player account skill rating update may be based partly on the gameplay contributions made by a respectively associated player character, such that the player account receives a portion of the total value of a player team skill rating update that corresponds to the contribution the player account made towards the total value in gameplay.

At step 520, the skill measurement system 222 can update the skill ratings of player teams and/or player accounts based in part on the results of steps 516 and 518. In some embodiments, another service among gameplay service 220 can update the respective skill ratings.

The steps of process 500 may be configured in different orders or arrangements, such that one step is performed in substitution of, or in conjunction with, another step. In some embodiment, process 500 includes either step 516 or 518, but not both. In some embodiments, steps 516 and 518 occur as a single step.

Computing Device

Figure 6:
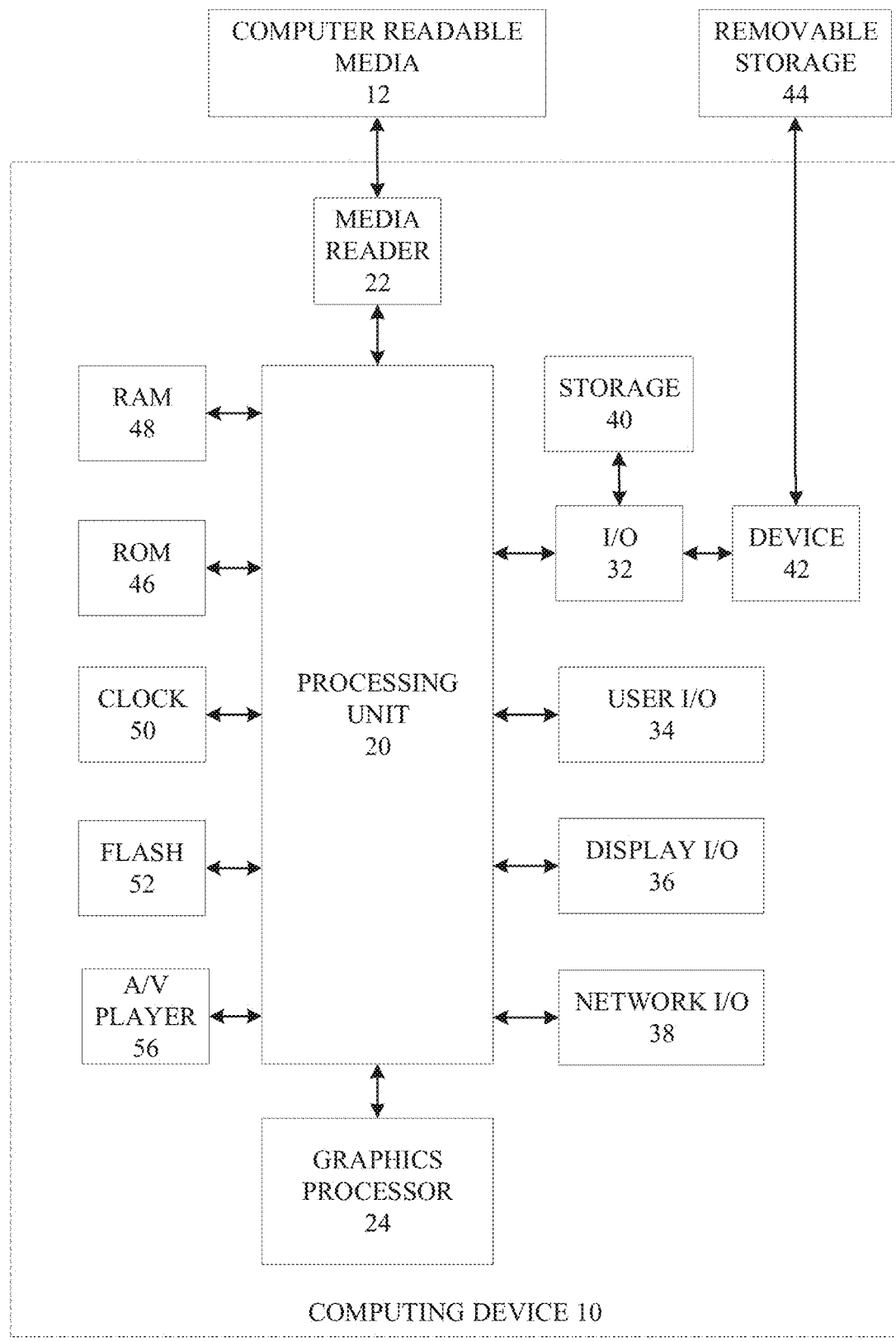
FIG. 6 illustrates an example embodiment of a computing device.

FIG. 6 illustrates an embodiment of the resources within a computing device 10. In some embodiments, computing devices 110 of FIG. 1 are similar to and/or include portions or components of the computing device 10.

Other variations of the computing device 10 may be substituted for the examples explicitly presented herein, such as removing or adding components to the computing device 10. The computing device 10 may include a video game console, a smart phone, a tablet, a personal computer, a laptop, a smart television, a server, and the like.

As shown, the computing device 10 includes a processing unit 20 that interacts with other components of the computing device 10 and external components. A media reader 22 is included that communicates with computer readable media 12. The media reader 22 may be an optical disc reader capable of reading optical discs, such as DVDs or BDs, or any other type of reader that can receive and read data from computer readable media 12. One or more of the computing devices may be used to implement one or more of the systems disclosed herein.

Computing device 10 may include a graphics processor 24. In some embodiments, the graphics processor 24 is integrated into the processing unit 20, such that the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a video game console device, a general-purpose laptop or desktop computer, a smart phone, a tablet, a server, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently during execution of software.

User I/O 34 is used to send and receive commands between processing unit 20 and user devices, such as keyboards or game controllers. In some embodiments, the user I/O 34 can include a touchscreen. The touchscreen can be a capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, graphical user interfaces (GUIs), video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM can hold data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Some portions of the detailed descriptions above are presented in terms of symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The disclosed subject matter also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The disclosed subject matter may be provided as a computer program product, or software, that may include a machine-readable medium having stored thereon instructions, which may be used to program a computer system (or other electronic devices) to perform a process according to the disclosed subject matter. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Certain example embodiments are described above to provide an overall understanding of the principles of the structure, function, manufacture and use of the devices, systems, and methods described herein. One or more examples of these embodiments are illustrated in the accompanying drawings. Those skilled in the art will understand that the descriptions herein and the accompanying drawings are intended to be illustrative, and not restrictive. Many other implementations will be apparent to those of skill in the art based upon the above description. Such modifications and variations are intended to be included within the scope of the present disclosure. The scope of the present disclosure should, therefore, be considered with reference to the claims, along with the full scope of equivalents to which such claims are entitled. The features illustrated or described in connection with one exemplary embodiment may be combined with the features of other embodiments. In some instances, well-known structures and devices are shown in block diagram form, rather than in detail, in order to avoid obscuring the disclosed subject matter.

What is claimed:

1. A system comprising:
   one or more processors; and
   a computer-readable storage medium including machine-readable instructions that, when executed by the one or more processors, cause the one or more processors to:
   monitor gameplay data of a gameplay session of a video game, the gameplay data comprising interaction data corresponding to instances of interactions among a plurality of player teams connected to the gameplay session;
   detect, based on the monitoring, a first interaction of at least one or more instances of interactions between two or more player teams among the plurality of player teams, and a first outcome to the first interaction;
   determine subsets of the plurality of player teams involved in the first interaction;
   determine an interaction uncertainty for the first interaction based at least in part on gameplay data associated with the first interaction, wherein the interaction uncertainty is determined after the first outcome of the first interaction; and
   determine, for each player team involved in the first interaction, a skill rating update based at least in part on the (i) first outcome and (ii) the interaction uncertainty for the first interaction, wherein the skill rating update includes:
   (i) a player team skill rating update, wherein the player team skill rating is a skill rating associated with the combination of player accounts included within the player team, and
   (ii) a player account skill rating update for one or more of the player accounts associated with each player team.

2. The system of claim 1, wherein the gameplay data associated with the first interaction includes gameplay actions of player characters and in-game status of player characters.

3. The system of claim 2, wherein each player team includes a plurality of player characters, wherein each player account associated with each player team is associated with at least one player character of the player team and wherein the gameplay data further comprises:
   (i) skill ratings of player accounts, wherein the skill ratings of player accounts are values indicating the skill rating of a player account;
   (ii) skill ratings of player teams, wherein the skill ratings of player teams are based at least in part on the skill ratings of player accounts associated with each respective player team,
   (iii) win probabilities of player teams, wherein the win probabilities of each player team is based at least in part on the skill ratings of one or more player teams participating in the gameplay session, or
   (iv) placement results of players teams, the placement results corresponding to the placement each player team achieves in the gameplay session.

4. The system of claim 3, wherein determining the skill rating updates from an outcome of an instance of interaction is further based in part on at least one of the following gameplay data corresponding to one or more of the player teams associated with a respective subset:
   (i) the skill ratings of player accounts,
   (ii) the skill ratings of player teams,
   (iii) win probabilities of player teams,
   (iv) placement results, or
   (v) gameplay actions of player characters.

5. The system of claim 4, wherein the interaction uncertainty to each of the respective instances of interactions is based at least in part on one of the following:
   (i) player uncertainty, wherein player uncertainty corresponds to an uncertainty in skill of a player,
   (ii) player team uncertainty, wherein player team uncertainty corresponds to an uncertainty in skill among the player team, or
   (iii) a gameplay uncertainty, wherein the gameplay uncertainty corresponds to the gameplay session.

6. The system of claim 5, wherein the gameplay uncertainty is based at least in part on an uncertainty corresponding to one or more aspects of gameplay in the gameplay session.

7. The system of claim 6, wherein the interaction uncertainty affects a skill rating determination from an outcome of an instance of interaction.

8. A computer implemented method to measure player skill in a video game, the method comprising:
   monitoring gameplay data of a gameplay session of a video game, the gameplay data comprising interaction data corresponding to instances of interactions among a plurality of player teams connected to the gameplay session;
   detecting, based on the monitoring, a first interaction of at least one or more instances of interactions between two or more player teams among the plurality of player teams, and a first outcome to the first interaction;
   determining subsets of the plurality of player teams involved in the first interaction;
   determining an interaction uncertainty for the first interaction based at least in part on gameplay data associated with the first interaction, wherein the interaction uncertainty is determined after the first outcome of the first interaction;
   determining, for each player team involved in the first interaction, a skill rating update based at least in part on the (i) first outcome and (ii) the interaction uncertainty for the first interaction, wherein the skill rating update includes:
      (i) a player team skill rating update, wherein the player team skill rating is a skill rating associated with the combination of players accounts included within the player team, and
      (ii) a player account skill rating update for one or more of the player accounts associated with each player team.

9. The computer implemented method of claim 8, wherein the gameplay data associated with the first interaction includes gameplay actions of player characters and in-game status of player characters.

10. The computer implemented method of claim 9, wherein each player team includes a plurality of player characters, wherein each player account associated with each player team is associated with at least one player character of the player team and wherein gameplay data further comprises:
    (i) skill ratings of player accounts, wherein the skill ratings of player accounts are values indicating the skill rating of a player account;
    (ii) skill ratings of player teams, wherein the skill ratings of player teams are based at least in part on the skill ratings of player accounts associated with each respective player team,
    (iii) win probabilities of player teams, wherein the win probabilities of each player team is based at least in part on the skill ratings of one or more player teams participating in the gameplay session, or
    (iv) placement results of players teams, the placement results corresponding to the placement each player team achieves in the gameplay session.

11. The computer implemented method of claim 10, wherein determining skill rating updates from an outcome of an instance of interaction is further based in part on at least one of the following gameplay data corresponding to one or more of the player teams associated with a respective subset:
    (i) the skill ratings of player accounts,
    (ii) the skill ratings of player teams,
    (iii) win probabilities of player teams,
    (iv) placement results, or
    (v) gameplay actions of player characters.

12. The computer implemented method of claim 11, wherein the interaction uncertainty to each of the respective instances of interactions is based at least in part on one of the following:
    (i) player uncertainty, wherein player uncertainty corresponds to an uncertainty in skill of a player,
    (ii) player team uncertainty, wherein player team uncertainty corresponds to an uncertainty in skill among the player team, or
    (iii) a gameplay uncertainty, wherein the gameplay uncertainty corresponds to the gameplay session.

13. The computer implemented method of claim 12, wherein the gameplay uncertainty is based at least in part on an uncertainty corresponding to one or more aspects of gameplay in the gameplay session.

14. The computer implemented method of claim 13, wherein the interaction uncertainty affects a skill rating determination from an outcome of an instance of interaction.

15. A non-transitory computer readable medium comprising machine-readable instructions to measure player skill in a video game by:
> monitoring gameplay data of a gameplay session of a video game, the gameplay data comprising interaction data corresponding to instances of interactions among a plurality of player teams connected to the gameplay session;
> detecting, based on the monitoring, a first interaction of at least one or more instances of interactions between two or more player teams among the plurality of player teams, and a first outcome to the first interaction;
> determining subsets of the plurality of player teams involved in the first interaction;
> determining an interaction uncertainty for the first interaction based at least in part on gameplay data associated with the first interaction, wherein the interaction uncertainty is determined after the first outcome of the first interaction;
> determining, for each player team involved in the first interaction, a skill rating update based at least in part on the (i) first outcome and (ii) the interaction uncertainty for the first interaction, wherein the skill rating update includes:
>> (i) a player team skill rating update, wherein the player team skill rating is a skill rating associated with the combination of players accounts included within the player team, and
>> (ii) a player account skill rating update for one or more of the player accounts associated with each player team.

16. The non-transitory computer readable medium of claim 15, wherein the gameplay data associated with the first interaction includes gameplay actions of player characters and in-game status of player characters.

17. The non-transitory computer readable medium of claim 16, wherein each player team includes a plurality of player characters, wherein each player account associated with each player team is associated with at least one player character of the player team and wherein gameplay data further comprises:
> (i) skill ratings of player accounts, wherein the skill ratings of player accounts are values indicating the skill rating of a player account;
> (ii) skill ratings of player teams, wherein the skill ratings of player teams are based at least in part on the skill ratings of player accounts associated with each respective player team;
> (iii) win probabilities of player teams, wherein the win probabilities of each player team is based at least in part on the skill ratings of one or more player teams participating in the gameplay session; or
> (iv) placement results of players teams, the placement results corresponding to the placement each player team achieves in the gameplay session.

18. The non-transitory computer readable medium of claim 17, wherein determining skill rating updates from an outcome of an instance of interaction is further based in part on at least one of the following gameplay data corresponding to one or more of the player teams associated with a respective subset:
> (i) the skill ratings of player accounts,
> (ii) the skill ratings of player teams,
> (iii) win probabilities of player teams,
> (iv) placement results, or
> (v) gameplay actions of player characters.

19. The non-transitory computer readable medium of claim 18, wherein the interaction uncertainty to each of the respective instances of interactions is based at least in part on one of the following:
> (i) player uncertainty, wherein player uncertainty corresponds to an uncertainty in skill of a player,
> (ii) player team uncertainty, wherein player team uncertainty corresponds to an uncertainty in skill among the player team, or
> (iii) a gameplay uncertainty, wherein the gameplay uncertainty corresponds to the gameplay session.

20. The non-transitory computer readable medium of claim 18, wherein the gameplay uncertainty is based at least in part on an uncertainty corresponding to one or more aspects of gameplay in the gameplay session.

* * * * *